Patented Nov. 15, 1927.

UNITED STATES PATENT OFFICE.

GUY VAN SCOYOC, OF SALT LAKE CITY, UTAH, AND HENRY L. WEHRBEIN, OF INDIANAPOLIS, INDIANA.

CALCIUM-SUGAR PREPARATION AND METHOD OF TREATMENT.

No Drawing.      Application filed May 1, 1924. Serial No. 710,433.

It is the object of our invention to make it possible to use calcium advantageously in the treatment of disease, with more beneficial effects and less objectionable effects than are now obtained in calcium treatment and especially to do so in treatment by intravenous injection; and to do this with a calcium product in which the calcium is combined with a substance which is itself readily tolerated in the human body and which permits the beneficial therapeutic effects and substantially prevents the objectionable effects from the calcium.

The use of calcium by intravenous injection is indicated in a number of diseases, especially in tuberculosis, and also in hay-fever, asthma, urticaria, and others; but with the calcium compounds heretofore mainly used there was a considerable degree of toxicity, a certain lack of bodily tolerance, a lack of complete response to the quantity of calcium used, and sometimes disagreeable after effects such as collapse.

We discovered some time ago that a calcium-glucose preparation had certain beneficial effects in relieving certain of the diseases above named, especially tuberculosis, and that product was used with a considerable degree of success. This prior product was directly of calcium and glucose, and in its use it was contemplated that whatever compounds were formed in the product with the calcium should be dircetly of the glucose, with no thought of any glucose-degradation products; for the product was used intravenously before any degradation of the glucose by reason of the presence of the calcium occurred.

We have now discovered that while this product of calcium with unmodified glucose is effective in relieving disease, it is not free from certain objectionable effects, particularly on the walls of the veins in which the intravenous injection is made. We have also found that these effects on the vein-walls may be avoided by permitting partial degradation of the sugar to occur in the presence of the calcium before the intravenous injection is made, so that the product is at least partially of calcium with certain degradation-products of glucose instead of with glucose itself. If the degradation of the glucose is carried sufficiently far, we find that we substantially eliminate the objectionable effects of the calcium-glucose product, and avoid the undesirable actions on the vein-walls of the patient at and near the point of injection, while retaining substantially the full beneficial effects of the calcium; but if we allow the degradation to proceed too far, we destroy such beneficial effects of the calcium. In other words, as the degradation of the sugar proceeds, the undesirable effects decrease rapidly at first, and largely disappear before the beneficial therapeutic effects are effected, for the beneficial therapeutic effects diminish little in the early part of such degradation but disappear mainly in the latter part thereof.

Our present invention, therefore, contemplates the use of a product containing calcium and certain products resulting from the partial degradation of sugar in the presence of calcium. The sugar we prefer to use is glucose or dextrose, but we find that we can use any of the varieties of sugar in which there is a free aldehyde or ketone group, of which the hexoses are the most desirable. We find that sugars which do not have free aldehyde or ketone groups, such as sucrose, are not suitable, because they form no degradation products in the presence of calcium.

In carrying out our invention, we mix the sugar, most desirably dextrose, with calcium hydroxide, in water. Following this mixing, a certain degradation of the dextrose starts, which degradation will continue through a number of intermediate steps to a final complete-degradation product if allowed to continue sufficiently long. This degradation occurs slowly at normal temperatures, but is greatly hastened by heat. Therefore, while we can merely let the mixture stand for a suitable time, it is generally desirable to accelerate the degradation by heat; but the temperature should not reach the boiling point.

This degradation, however, should not be carried too far. To get the desired degradation, and to have the product at the desired point of sugar-degradation when the intravenous injection is made, we prefer to mix the dextrose and calcium hydroxide shortly before the injection is to be made, and then to heat the mixture until it reaches a rich brown color, but is still transparent; following which we quickly cool the solution, and quickly make the desired injection. The physician may readily determine this color by the eye, for we believe it is not essential that the degradation be carried to an exact point, as we find that considerable range in color will remove the objectionable effects while still preserving the beneficial effects. This same color change occurs whether or not heat is used, but it occurs quite slowly in the cold. If other than a mere color determination of the extent of the degradation is desired, it may be obtained by the use of phenolphthalein; the degradation being carried on until the alkalinity of the sugar-calcium product as measured by phenolphthalein titration is less than one-half that of the original solution, and desirably between 10% and 35% thereof. The partial degradation product thus obtained should be administered promptly after this point of degradation is reached, for if the product is allowed to stand, even in the cold, the degradation continues and the beneficial effects of the calcium are destroyed.

In making our product, we preferably proceed in the following manner. We prepare a water solution of sugar; which may be any of the sugars above referred to, though dextrose is preferable. This solution may be of any desired concentration, but is desirably of fairly high concentration—usually from twenty per cent (20%) to twenty-five per cent (25%)—so that a considerable quantity of the final sugar-product may be contained in a relatively small volume. To this sugar solution, conveniently at room temperature, we add calcium oxide or calcium hydroxide in less than one molecular weight of calcium hydroxide for one molecular weight of sugar. With dextrose, this means at least two and one half parts by weight of dextrose to one part by weight of calcium hydroxide. We prefer to use rather more sugar than this, however, and find it desirable to use five to fifteen parts by weight of dextrose (for instance) to one part by weight of calcium hydroxide. The calcium hydroxide is much more soluble in this sugar solution than in water. We then filter to remove undesirable products. While we can let this product stand until the desired degradation occurs, as such degradation occurs spontaneously, we preferably heat the product, to less than boiling but conveniently fairly close to boiling, until it takes on a rich brown color; and then we quickly cool the solution, and inject it intravenously.

We have found that the product may be dispensed in several ways. We may dispense the sugar solution (in water if desired) and the calcium hydroxide in separate packages, the contents of which the physician may mix and heat for himself, the heating producing not only the degradation of the sugar but also effective sterilization. Probably the advantageous way of dispensing, however, is that set forth in the co-pending application of ourselves and Horace A. Shonle, Serial No. 710,434, of even filing date herewith; but as that forms no part of the present invention, we shall not attempt to describe it here.

We claim as our invention:—

1. The method of using calcium intravenously, comprising forming in solution a product of calcium and a partial-degradation product of a sugar containing a free aldehyde or ketone group, and injecting said calcium-sugar product intravenously when said degradation is at an intermediate stage 2. The method set forth in claim 1, with the addition that the sugar is a hexose.

3. The method set forth in claim 1, with the addition that the sugar used is dextrose.

4. The method set forth in claim 1, with the addition that the molecular amount of sugar used exceeds that of calcium.

5. The method set forth in claim 1, with the addition that the sugar used is a hexose, and that the molecular amount of hexose used exceeds that of calcium.

6. The method set forth in claim 1, with the addition that the sugar used is dextrose, and that the molecular amount of dextrose used exceeds that of calcium.

7. The method set forth in claim 1, with the addition that the degradation is continued to a point where the alkalinity of the product is less than one-half that of the original calcium-sugar product, and that the injection is made before further degradation thereof.

8. The method set forth in claim 1, with the addition that the sugar is a hexose, and that the degradation is continued to a point where the alkalinity of the product is less than one-half that of the original calcium-hexose product, and that the injection is made before further degradation thereof.

9. The method set forth in claim 1, with the addition that the sugar used is dextrose, and that the degradation is continued to a point where the alkalinity of the product is less than one-half that of the original calcium-dextrose product, and that the injection is made before further degradation thereof.

10. The method set forth in claim 1, with the addition that the injection is made when the degradation of the sugar has continued sufficiently far to substantially eliminate the objectionable effects of the calcium on the vein-walls but not sufficiently far to destroy the beneficial effects of the calcium on the disease.

11. The method set forth in claim 1, with the addition that the sugar is a hexose, and that the injection is made when the degradation of the hexose has continued sufficiently far to substantially eliminate the objectionable effects of the calcium on the vein-walls but not sufficiently far to destroy the beneficial effects of the calcium on the disease.

12. The method set forth in claim 1, with the addition that the sugar used is dextrose, and that the injection is made when the degradation of the dextose has continued sufficiently far to substantially eliminate the objectionable effects of the calcium on the vein-walls but not sufficiently far to destroy the beneficial effects of the calcium on the disease.

13. A chemical product, comprising the result obtained by mixing calcium hydroxide with a solution of a sugar having a free aldehyde or ketone group, in the proportion of at least one part by weight of calcium hydroxide to fifteen parts of sugar, and permitting degradation to proceed under heat until such result has an alkalinity of less than one-half of the alkalinity of the composition at the start of the degradation.

14. The chemical product set forth in claim 13, with the addition that the sugar with which the calcium hydroxide is mixed is a hexose.

15. The chemical product set forth in claim 13, with the addition that the sugar with which the calcium hydroxide is mixed is dextrose.

16. A chemical product, comprising the result obtained by mixing calcium hydroxide with a solution of a sugar having a free aldehyde or ketone group, in the proportion of at least one part by weight of calcium hydroxide to fifteen parts of sugar, and permitting degradation to proceed until such result has an alkalinity of less than one-half of the alkalinity of the composition at the start of the degradation.

17. The chemical product set forth in claim 16, with the addition that the sugar with which the calcium hydroxide is mixed is a hexose.

18. The chemical product set forth in claim 16, with the addition that the sugar with which the calcium hydroxide is mixed is dectrose.

19. A chemical product suitable for intravenous injection in the treatment of diseases where calcium is indicated, comprising the result obtained by mixing calcium hydroxide with a solution of a sugar having a free aldehyde or ketone group, in the proportion of at least one part by weight of calcium hydroxide to fifteen parts of sugar, and permitting partial degradation of the sugar to a point where destructive action of the result on the vein-walls is substantially eliminated but the therpeutic effect of the calcium is largely retained.

20. The chemical product set forth in claim 19, with the addition that the sugar with which the calcium bydroxide is mixed is a hexose.

21. The chemical product set forth in claim 19, with the addition that the sugar with which the calcium hydroxide is mixed is dextrose.

In witness whereof, I, GUY VAN SCOYOC, have hereunto set my hand at Salt Lake City, Utah, this 23 day of April, 1924.

GUY VAN SCOYOC.

In witness whereof, I, HENRY L. WEHRBEIN, have hereunto set my hand at Indianapolis, Indiana, this 29th day of April, 1924.

HENRY L. WEHRBEIN.

ciently far to substantially eliminate the objectionable effects of the calcium on the vein-walls but not sufficiently far to destroy the beneficial effects of the calcium on the disease.

12. The method set forth in claim 1, with the addition that the sugar used is dextrose, and that the injection is made when the degradation of the dextose has continued sufficiently far to substantially eliminate the objectionable effects of the calcium on the vein-walls but not sufficiently far to destroy the beneficial effects of the calcium on the disease.

13. A chemical product, comprising the result obtained by mixing calcium hydroxide with a solution of a sugar having a free aldehyde or ketone group, in the proportion of at least one part by weight of calcium hydroxide to fifteen parts of sugar, and permitting degradation to proceed under heat until such result has an alkalinity of less than one-half of the alkalinity of the composition at the start of the degradation.

14. The chemical product set forth in claim 13, with the addition that the sugar with which the calcium hydroxide is mixed is a hexose.

15. The chemical product set forth in claim 13, with the addition that the sugar with which the calcium hydroxide is mixed is dextrose.

16. A chemical product, comprising the result obtained by mixing calcium hydroxide with a solution of a sugar having a free aldehyde or ketone group, in the proportion of at least one part by weight of calcium hydroxide to fifteen parts of sugar, and permitting degradation to proceed until such result has an alkalinity of less than one-half of the alkalinity of the composition at the start of the degradation.

17. The chemical product set forth in claim 16, with the addition that the sugar with which the calcium hydroxide is mixed is a hexose.

18. The chemical product set forth in claim 16, with the addition that the sugar with which the calcium hydroxide is mixed is dectrose.

19. A chemical product suitable for intravenous injection in the treatment of diseases where calcium is indicated, comprising the result obtained by mixing calcium hydroxide with a solution of a sugar having a free aldehyde or ketone group, in the proportion of at least one part by weight of calcium hydroxide to fifteen parts of sugar, and permitting partial degradation of the sugar to a point where destructive action of the result on the vein-walls is substantially eliminated but the therpeutic effect of the calcium is largely retained.

20. The chemical product set forth in claim 19, with the addition that the sugar with which the calcium bydroxide is mixed is a hexose.

21. The chemical product set forth in claim 19, with the addition that the sugar with which the calcium hydroxide is mixed is dextrose.

In witness whereof, I, GUY VAN SCOYOC, have hereunto set my hand at Salt Lake City, Utah, this 23 day of April, 1924.

GUY VAN SCOYOC.

In witness whereof, I, HENRY L. WEHRBEIN, have hereunto set my hand at Indianapolis, Indiana, this 29th day of April, 1924.

HENRY L. WEHRBEIN.

Certificate of Correction.

Patent No. 1,649,269.      Granted November 15, 1927, to

GUY VAN SCOYOC ET AL.

It is hereby certified that error appears in the printed specification of the above-numbered patent requiring correction as follows: Page 3, line 50, claim 18, for the misspelled word "dectrose" read *dextrose;* same page, line 66, claim 20, for the misspelled word "bydroxide" read *hydroxide;* and that the said Letters Patent should be read with these corrections therein that the same may conform to the record of the case in the Patent Office.

Signed and sealed this 13th day of December, A. D. 1927.

[SEAL.]

M. J. MOORE,
*Acting Commissioner of Patents.*

Certificate of Correction.

Patent No. 1,649,269.  Granted November 15, 1927, to

GUY VAN SCOYOC ET AL.

It is hereby certified that error appears in the printed specification of the above-numbered patent requiring correction as follows: Page 3, line 50, claim 18, for the misspelled word "dectrose" read *dextrose;* same page, line 66, claim 20, for the misspelled word "bydroxide" read *hydroxide;* and that the said Letters Patent should be read with these corrections therein that the same may conform to the record of the case in the Patent Office.

Signed and sealed this 13th day of December, A. D. 1927.

[SEAL.]

M. J. MOORE,
*Acting Commissioner of Patents.*